Aug. 7, 1934.                    H. F. DIXON                      1,968,810
                                  HUB BRAKE
                              Filed June 9, 1930           2 Sheets-Sheet 1

INVENTOR
Howard F. Dixon.
BY
ATTORNEY

Aug. 7, 1934.   H. F. DIXON   1,968,810
HUB BRAKE
Filed June 9, 1930   2 Sheets-Sheet 2

INVENTOR
Howard F. Dixon.
BY *Whittemore Hulbert*
*Whittemore & Belknap*
ATTORNEY Patented Aug. 7, 1934

1,968,810

UNITED STATES PATENT OFFICE

1,968,810
HUB BRAKE

Howard F. Dixon, Buffalo, N. Y., assignor to Kelsey-Hayes Wheel Corporation, Detroit, Mich., a corporation of New York Application June 9, 1930, Serial No. 460,026

9 Claims. (Cl. 188—18)

Figure 1:
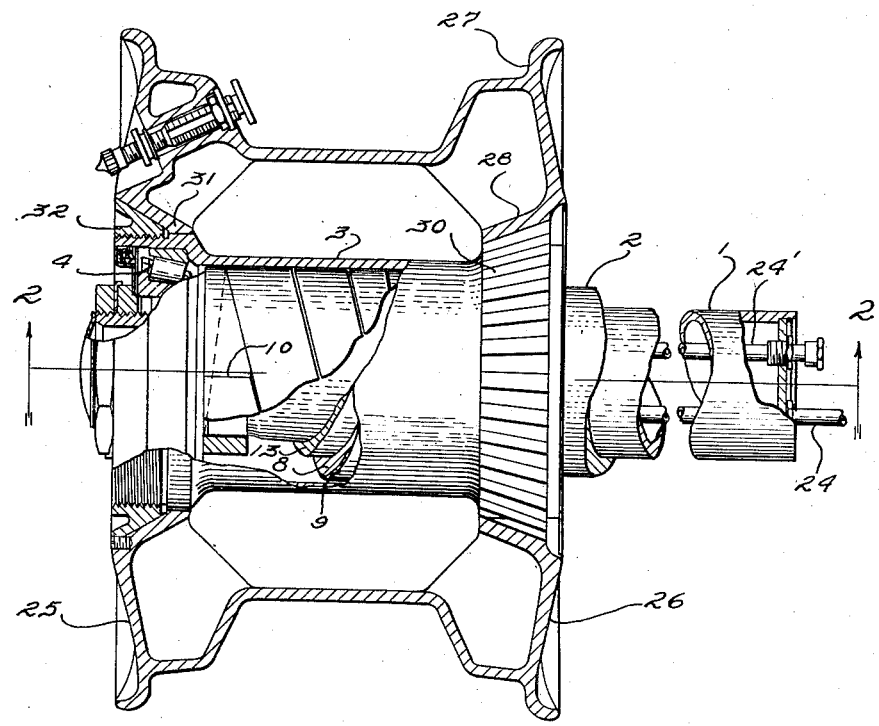
Figure 2:
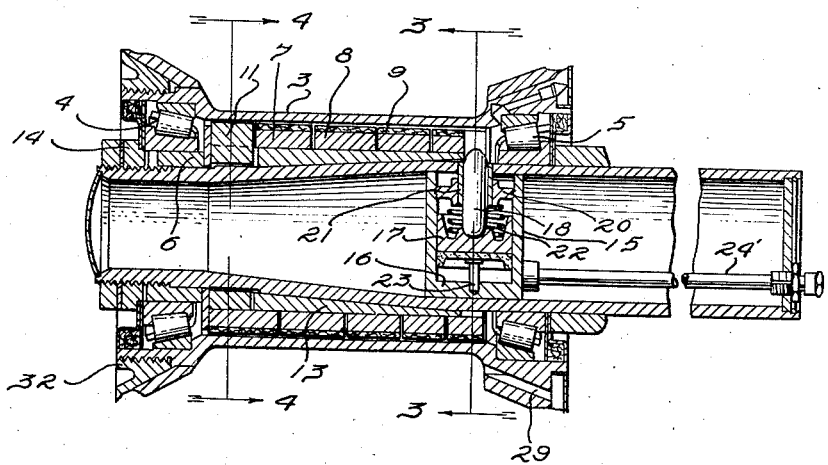
Figure 4:
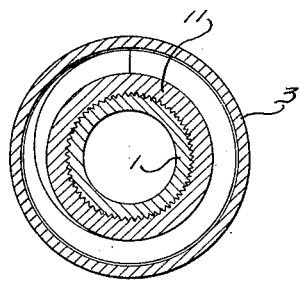
Figure 3:
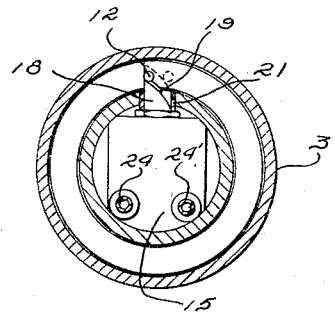
Figure 5:
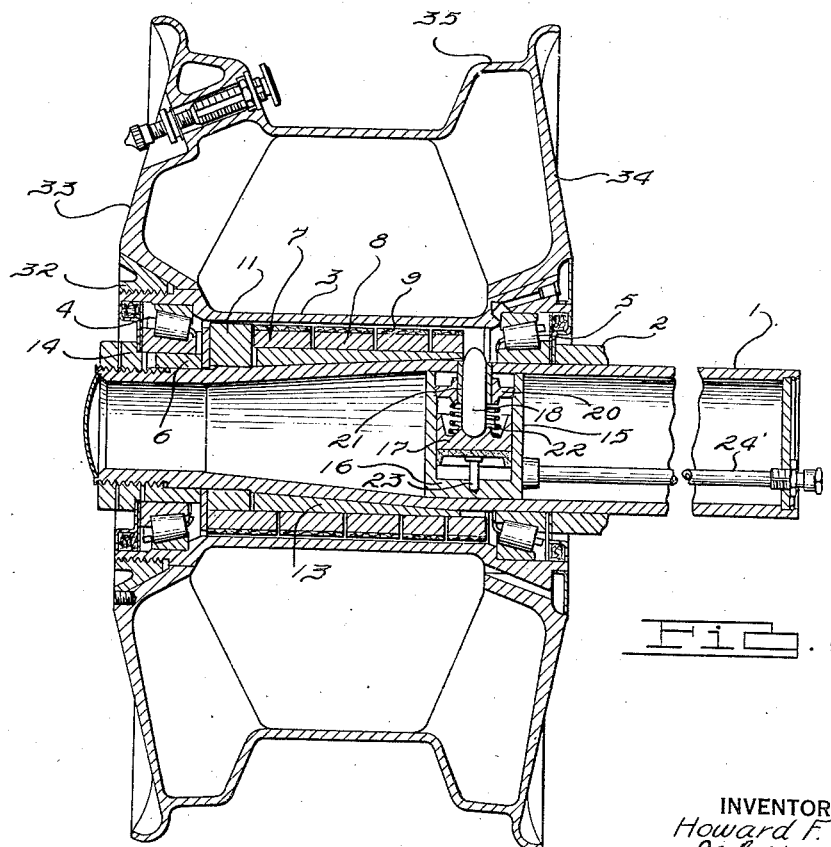

The invention relates to brake assemblies and has for one of its objects to construct the brake assembly presenting the minimum of air resistance. Another object is to so construct the brake assembly that it is applicable to wheels for carrying different loads. A further object is to provide an improved means for actuating the braking element. These and other objects will become apparent from the following description taken in connection with the drawings, in which Figure 1 is a transverse section, partly in elevation, of a wheel and brake assembly showing an embodiment of my invention;

Figure 2 is a cross section on the line 2—2 of Figure 1;

Figures 3 and 4 are cross sections, respectively, on the lines 3—3 and 4—4 of Figure 2;

Figure 5 is a view similar to Figure 2, showing a modified wheel.

As illustrating an embodiment of my invention, the brake assembly in the present instance is for use in an aircraft wheel where it finds particular utility and in which it is highly advantageous to reduce the air resistance to the minimum. 1 is the axle, which is rigidly secured to the support 2 of an aircraft. 3 is one of the braking members in the nature of a hub encircling the axle and having front and rear enlarged ends for connection to the wheel. 4 and 5 are anti-friction bearings within the front and rear enlarged ends, respectively, of the hub, the inner race of the front bearing being supported upon the bushing 6 and the inner race of the rear bearing being supported upon the axle 1, the axle preferably tapering from a point adjacent the rear anti-friction bearing to a point adjacent the bushing to reduce its weight.

7 is a braking member or element encircling the axle 1 and engageable with the inner face of the hub 3 intermediate its front and rear enlarged ends to retard its rotation. This braking member or element comprises the spiral resilient metal body 8 and the brake lining 9 secured to the outer face of the body. The front end of the braking element is engageable with the shoulder 10 formed upon the abutment member or collar 11, which is fixed to the axle 1 as by being splined thereto rearwardly of the anti-friction bearing 4. The rear end of this spiral braking element is preferably provided with the anti-friction roller 12. Between the inner face of the spiral braking element and the axle there preferably is the sleeve 13, which is free to revolve upon the axle and which is engaged with the spiral braking element prior to its assembly with the other parts. The parts of the brake assembly thus far described are secured together by suitable means, such as the nut 14 threaded upon the front end of the axle 1.

For actuating the spiral braking element to expand the same into engagement with the co-operating braking element or the hub, I have provided a construction which is housed within the axle 1 and because of this and also of the fact that the hub encircles or houses the brake, air resistance is reduced to the minimum. In detail, 15 is a cylinder within the axle 1 and extending transversely thereof and having the closed end 16. 17 is a piston slidable within this cylinder and 18 is a plunger having a rounded inner end engaging a correspondingly shaped socket in the piston. This plunger extends transversely through a wall of the axle and has its outer end formed with the cammed face 19 engageable with the roller 12 to unwrap and expand the spiral braking element 7 into contact with the hub 3. 20 is a suitable plate or spider member threadedly engaging within the open end of the cylinder 15 and having secured thereto the sleeve 21 for guiding the plunger 18. 22 is a coil spring between the member 20 and the piston 17 for normally returning the latter to its inoperative position, at which time it engages a stop pin 23 secured to the closed end 16 of the piston. 24 and 24' are pipes extending longitudinally within the axle 1 and opening into the space between the closed end 16 and the piston 17. The pipe 24 is also connected to suitable means, such as a master cylinder and piston therewithin (not shown) for placing under pressure the fluid medium, which is liquid, for actuating the brake. The pipe 24' is used as an air bleed and during the filling of the space and pipes with the liquid medium its end is open for the escape of the air. As soon as the air is completely expelled by the liquid medium this open end is closed by a suitable cap.

The wheel, as shown in Figures 1, 2, 3 and 4 and to which the above described brake assembly is applicable, comprises the front and rear plates 25 and 26, respectively, and the rim member 27, which latter is in the present instance a drop center tire carrying rim. The rear plate has the forwardly tapering central boss 28, the inner face of which is formed with the annular series of teeth 29 for driving engagement with the correspondingly inclined teeth 30 upon the rear enlarged end of the hub 3. The front plate has the central boss 31, the inner face of which is preferably cylindrical for seating upon a corresponding portion of the front enlarged end of the hub 3. To provide for applying or removing the wheel, the smallest diameter of the annular series of teeth 30 is larger than the largest diameter of the front enlarged end of the hub. 32 is a nut threaded upon the front enlarged end of the hub for securing the wheel upon the hub.

The wheel, as shown in Figure 5 and to which the above described brake assembly is also applicable, has the same general arrangement of front and rear side plates 33 and 34, respectively, and rim member 35 as the wheel of Figures 1, 2, 3 and 4. This wheel is also similarly constructed for mounting upon the hub 3. The main difference between the two wheels is that the first mentioned is designed to carry a greater load than the other and consequently is built more substantially.

For the purpose of making the brake assembly applicable to both wheels, which represent a comparatively wide range of loads, and of securing the same action and results in both instances, the brake lining 9 only is changed to change its coefficient of friction without changing its shape or area. In other words, if the brake assembly is to be used with the wheel for carrying the greater load the brake lining is selected having a proportion of phosphorous to lead in the metallic composition of the brake lining, which is greater than that of the brake lining of the brake assembly to be used with the wheel for carrying the smaller load. Also the brake lining is selected so that the brake assembly in either wheel secures the same action and results.

What I claim as my invention is:

1. In a brake assembly, the combination with an axle, a hub mounted thereon and a spiral braking element within and engageable with the inner surface of said hub, of means within said axle for actuating said braking element to engage said hub.

2. In a brake assembly, the combination with an axle having a tubular axially extending portion and relatively movable braking members encircling the tubular portion of said axle, of fluid pressure actuated means extending transversely of the axis of the tubular portion and located within the latter, and a plunger slidable within said tubular portion and actuated by said means for actuating one of said braking members to engage the other.

3. In a brake assembly, the combination with an axle having a tubular axially extending portion and relatively movable braking members encircling the tubular portion of said axle, of a cylinder extending transversely within the said tubular portion, a piston slidable within said cylinder, and a plunger slidably mounted within the tubular portion aforesaid and actuated by said piston for actuating one of said braking members to engage the other.

4. In a brake assembly, the combination with an axle, a wheel hub mounted upon the axle and having portions spaced outwardly therefrom, of a braking element encircling said axle within the wheel hub and engageable with the latter, a cylinder extending transversely within said axle, a piston slidable within said cylinder, a plunger extending transversely through said axle and actuated by said piston to actuate one of said braking members to engage the other, and a member secured to said cylinder for guiding said plunger.

5. In a brake assembly, the combination with an axle and relatively movable braking members encircling said axle, one of said members being a spiral member adapted to be expanded into engagement with the other, of a cylinder extending transversely within said axle, a piston slidable within said cylinder, and a plunger engageable at one end with said piston and extending transversely through said axle and having a cammed surface at its opposite end for engaging an end of said spiral member.

6. In a brake assembly, the combination with an axle having an axially extending tubular portion and relatively movable braking members encircling the tubular portion, of a cylinder extending transversely within the tubular portion aforesaid of said axle, a piston slidable within said cylinder, a plunger engaging said piston and extending transversely through said tubular portion and adapted to engage one of said braking members, a member secured within said cylinder for guiding said plunger, and means between said member and piston for normally moving the latter away from the former.

7. In a brake assembly, the combination with an axle and a wheel hub mounted upon said axle and having portions spaced outwardly therefrom, of a spiral braking element encircling said axle within the wheel hub and engageable therewith, a cylinder located within said axle and extending transversely of the latter, a piston slidable within said cylinder, and a plunger extending transversely through said axle and having one end engageable with said piston and having a cam surface at its opposite end for engaging said spiral member to actuate the same.

8. In a brake assembly, the combination with an axle, a wheel hub mounted upon said axle and having a tubular portion encircling the axle in spaced relation thereto, of an expandible braking element located within the space between the axle and tubular portion for frictionally engaging the inner surface of the latter, and fluid pressure actuated means located within the axle and operatively connected to said braking element for expanding the same against the tubular portion of the hub.

9. In a brake assembly, the combination with an axle, a wheel hub mounted upon said axle and having a tubular portion encircling the axle in spaced relation thereto, of a spiral braking element located within the space aforesaid in concentric relation to the inner surface of the tubular portion, and means located within the axle and extending into the tubular portion for engaging the braking element to expand the same into frictional engagement with the tubular portion of the hub.

HOWARD F. DIXON.